United States Patent
Feng et al.

(10) Patent No.: US 9,048,006 B2
(45) Date of Patent: Jun. 2, 2015

(54) CARBON NANOTUBE PRECURSOR, CARBON NANOTUBE FILM AND METHOD FOR MAKING THE SAME

(75) Inventors: Chen Feng, Beijing (CN); Kai-Li Jiang, Beijing (CN); Zhuo Chen, Beijing (CN); Yong-Chao Zhai, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 648 days.

(21) Appl. No.: 12/649,538

(22) Filed: Dec. 30, 2009

(65) Prior Publication Data

US 2011/0039075 A1 Feb. 17, 2011

(30) Foreign Application Priority Data

Aug. 14, 2009 (CN) .......................... 2009 1 0109335

(51) Int. Cl.
| | |
|---|---|
| B32B 9/00 | (2006.01) |
| H01B 1/04 | (2006.01) |
| B82Y 30/00 | (2011.01) |
| B82Y 40/00 | (2011.01) |
| C01B 31/02 | (2006.01) |

(52) U.S. Cl.
CPC .............. *H01B 1/04* (2013.01); *Y10T 428/2457* (2013.01); *B82Y 30/00* (2013.01); *B82Y 40/00* (2013.01); *C01B 31/0233* (2013.01); *C01B 2202/08* (2013.01); *C01B 2202/34* (2013.01)

(58) Field of Classification Search
CPC ........................... C01B 2202/00; C01B 31/22
USPC .............. 428/408; 423/447.1, 447.2; 977/742
See application file for complete search history.

(56) References Cited

U.S. PATENT DOCUMENTS

| | | | |
|---|---|---|---|
| 5,534,294 A | 7/1996 | Kubota et al. | |
| 5,679,212 A | 10/1997 | Kato et al. | |
| 6,232,706 B1 * | 5/2001 | Dai et al. | 313/309 |
| 6,957,993 B2 * | 10/2005 | Jiang et al. | 445/50 |

(Continued)

FOREIGN PATENT DOCUMENTS

| | | | |
|---|---|---|---|
| CN | 1484275 | | 3/2004 |
| CN | 1484275 A | | 3/2004 |
| CN | 1705059 | | 12/2005 |
| CN | 1910767 A | | 2/2007 |
| JP | 2008-523254 | | 7/2008 |
| WO | WO2007/015710 | * | 2/2007 |

OTHER PUBLICATIONS

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

(Continued)

*Primary Examiner* — Daniel H Miller
(74) *Attorney, Agent, or Firm* — Novak Druce Connolly Bove + Quigg LLP

(57) ABSTRACT

A carbon nanotube film includes a plurality of carbon nanotubes. The plurality of carbon nanotubes is arranged approximately along a same first direction. The plurality of carbon nanotubes are joined end to end by van der Waals attractive force therebetween. The carbon nanotube film has a uniform width. The carbon nanotube film has substantially the same density of the carbon nanotubes along a second direction perpendicular to the first direction. The change in density across the width is within 10 percent. The present application also relates to a carbon nanotube film precursor and a method for making the carbon nanotube film.

15 Claims, 7 Drawing Sheets

(56) References Cited

U.S. PATENT DOCUMENTS

| | | |
|---|---|---|
| 2001/0019238 A1 | 9/2001 | Dai et al. |
| 2004/0051432 A1 | 3/2004 | Jiang et al. |
| 2005/0007002 A1 | 1/2005 | Golovchenko et al. |
| 2005/0167740 A1 | 8/2005 | Furukawa et al. |
| 2005/0264155 A1* | 12/2005 | Liu et al. ............ 313/309 |
| 2005/0266627 A1 | 12/2005 | Furukawa et al. |
| 2006/0258054 A1* | 11/2006 | Pan et al. ............ 438/122 |
| 2007/0123019 A1 | 5/2007 | Lim et al. |
| 2008/0018012 A1 | 1/2008 | Lemaire et al. |
| 2008/0170982 A1 | 7/2008 | Zhang et al. |

OTHER PUBLICATIONS

Iijima, Sumio, Helical Microtubules of Graphitic Carbon, Nature, Nov. 7, 1991, pp. 56-58.

Uniform patterned growth of carbon nanotubes without surface carbon, Appl. Phys. Lett., vol. 79, No. 10, Sep. 3, 2001, 2001:1534-1536, Teo et al.

* cited by examiner

CARBON NANOTUBE PRECURSOR, CARBON NANOTUBE FILM AND METHOD FOR MAKING THE SAME

CROSS-REFERENCE TO RELATED APPLICATIONS

This application claims all benefits accruing under 35 U.S.C. §119 from China Patent Application No. 200910109335.6, filed on Aug. 14, 2009 in the China Intellectual Property Office. The application is also related to copending application entitled, "DEVICE AND METHOD FOR MAKING CARBON NANOTUBE FILM", filed Sep. 24, 2009 Ser. No. 12/565,890.

BACKGROUND

1. Technical Field

The present disclosure relates to carbon nanotube structures and methods for making the same and, particularly, to a carbon nanotube precursor, a carbon nanotube film and a method for making the same.

2. Description of Related Art

Carbon nanotubes are novel carbonaceous material and have received a great deal of interest since the early 1990s. The carbon nanotubes are electrically conductive, chemically stable, and each can have a very small diameter (much less than 100 nanometers) and large aspect ratios (length/diameter). Thus, carbon nanotubes have become a significant focus of research and development for use in electron emitting devices, sensors, transistors, and other devices.

Generally, the carbon nanotubes prepared by conventional methods are in particle or powder forms. The particle or powder-shaped carbon nanotubes limit the applications in which they can be used. Thus, preparation of macro-scale carbon nanotube structures, such as carbon nanotube films, has attracted attention.

A conventional method for making a carbon nanotube film includes the steps of providing a growing substrate; forming a catalyst layer on the growing substrate; providing a reacting furnace, placing the growing substrate with the catalyst layer into the reacting furnace; introducing a carbonaceous gas, and heating the reacting furnace to grow the carbon nanotube film. However, the carbon nanotube film made by the above-described method is formed on the growing substrate and does not have a free-standing structure. Further, the carbon nanotubes in the carbon nanotube film are always entangled with each other and disorderly distributed therein. Thus, the excellent properties of the carbon nanotubes are poorly utilized.

A method for making a nanofiber film includes arranging nanofibers to provide a substantially parallel nanofiber array having a degree of inter-fiber connectivity within the nanofiber array, and drawing said nanofibers from the nanofiber array as a ribbon or sheet without substantially twisting the ribbon or sheet. The nanofiber array has a columnar shape and can be a carbon nanotube array.

When the nanofibers are drawn from the nanofiber array to form the ribbon or sheet, the width of the nanofiber ribbon or sheet is inevitably affected by the columnar nanofiber array, thus the nanofiber ribbon or sheet cannot have a uniform width, thereby it is not entirely suitable for industrial applications.

What is needed, therefore, is a carbon nanotube precursor, a carbon nanotube film and a method for making the same, wherein the carbon nanotube film has a uniform width.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
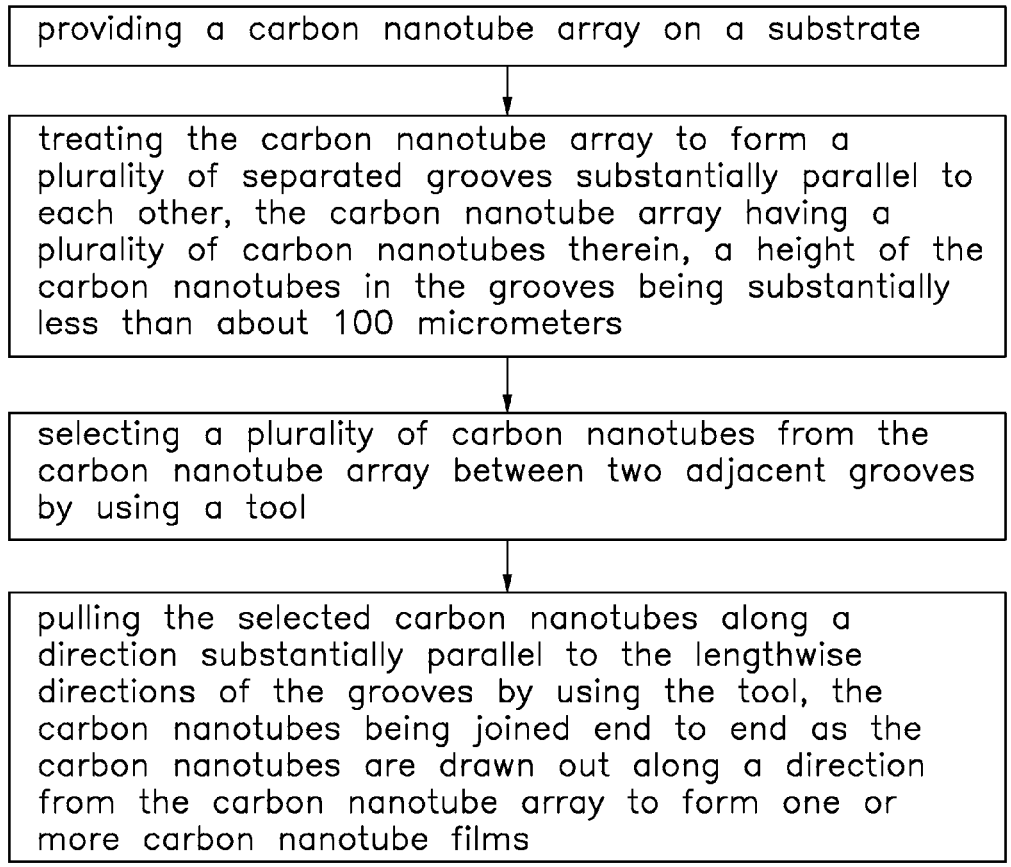
FIG. 1 is a chart of one embodiment of a method for making a carbon nanotube film.

Referring to FIG. 1, one embodiment of a method for making a carbon nanotube film includes:

providing a carbon nanotube array on a substrate;

treating the carbon nanotube array to form a plurality of separated grooves substantially parallel to each other, the carbon nanotube array having a plurality of carbon nanotubes therein, a height of the carbon nanotubes in the grooves being substantially less than about 100 micrometers;

selecting a plurality of carbon nanotubes from the carbon nanotube array between two adjacent grooves by using a tool;

pulling the selected carbon nanotubes along a direction substantially parallel to the lengthwise directions of the grooves by using the tool, the carbon nanotubes being joined end to end as the carbon nanotubes are drawn out along a direction from the carbon nanotube array to form one or more carbon nanotube films.

Figure 2:
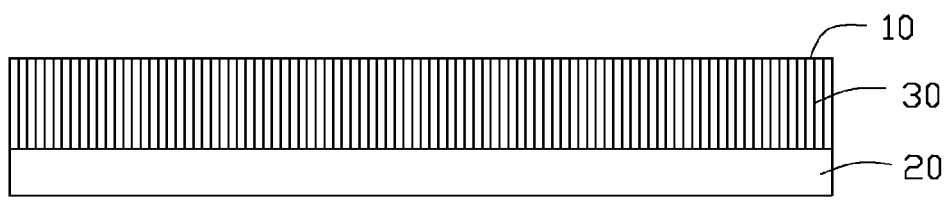
FIG. 2 is a schematic side view of a substrate with one embodiment of a carbon nanotube array grown thereon.

Referring to FIG. 2, the carbon nanotube array 10 includes a plurality of carbon nanotubes 30 arranged substantially along a same growing direction. The plurality of carbon nanotubes 30 in the carbon nanotube array 10 can be approximately perpendicular to the substrate. The carbon nanotube array 10 can be a super-aligned carbon nanotube array. The carbon nanotubes 30 in the carbon nanotube array 10 can be single-walled carbon nanotubes, double-walled carbon nanotubes, or multi-walled carbon nanotubes. Diameters of the single-walled carbon nanotubes can range from about 0.5 nanometers to about 50 nanometers. Diameters of the double-walled carbon nanotubes can range from about 1 nanometer to about 50 nanometers. Diameters of the multi-walled carbon nanotubes can range from about 1.5 nanometers to about 50 nanometers.

Figure 3:
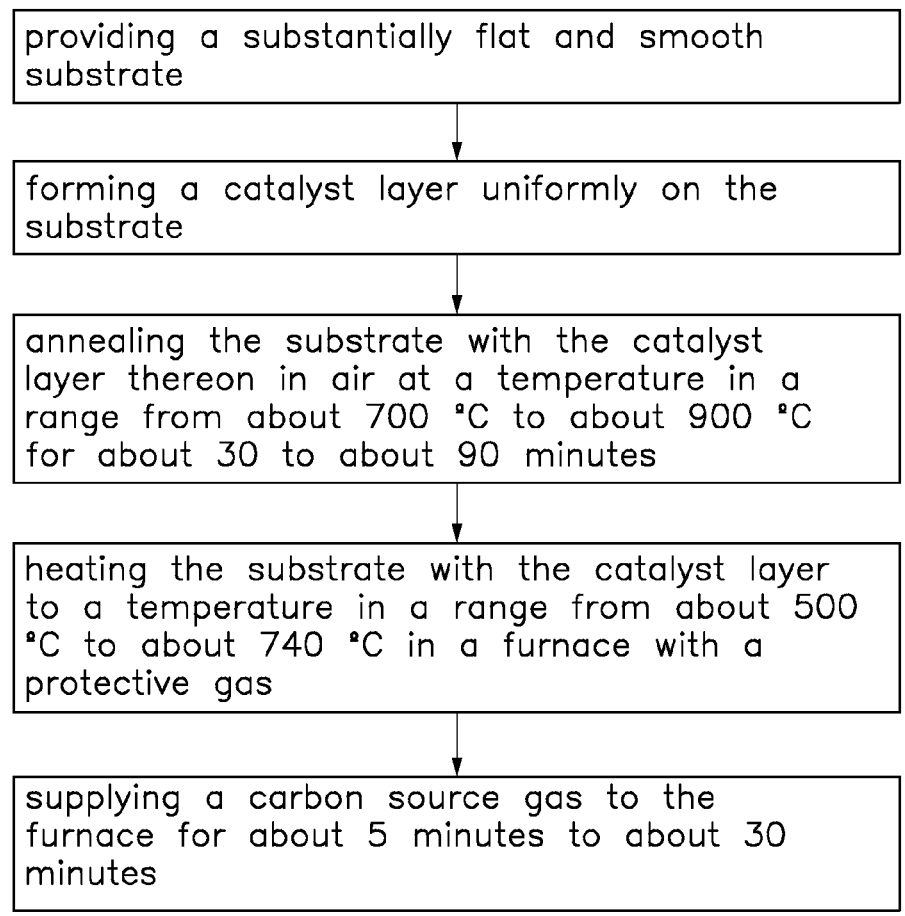
FIG. 3 is a chart of one embodiment of a method for growing a carbon nanotube array.

In one embodiment, the carbon nanotube array 10 is prepared by a chemical vapor deposition method. Referring to FIG. 3, one embodiment of a method for making the carbon nanotube array 10 using the chemical vapor deposition method includes:

providing a substantially flat and smooth substrate 20;

forming a catalyst layer uniformly on the substrate 20;

annealing the substrate 20 with the catalyst layer thereon in air at a temperature in a range from about 700° C. to about 900° C. for about 30 to about 90 minutes;

heating the substrate 20 with the catalyst layer to a temperature in a range from about 500° C. to about 740° C. in a furnace with a protective gas;

supplying a carbon source gas to the furnace for about 5 minutes to about 30 minutes.

The substrate 20 can be a P-type silicon wafer, an N-type silicon wafer, or a silicon wafer with a film of silicon dioxide thereon. A shape of the substrate 20 can be round or square. In one embodiment, a round 4-inch P-type silicon wafer is used as the substrate 20.

The step of forming a catalyst layer uniformly on the substrate 20 can be executed by a thermal deposition method, an electron beam deposition method or a sputtering method. The catalyst can be made of iron (Fe), cobalt (Co), nickel (Ni), or any alloy thereof. In one embodiment, the catalyst is iron.

The carbon source gas can be a hydrocarbon gas, such as ethylene ($C_2H_4$), methane ($CH_4$), acetylene ($C_2H_2$), ethane ($C_2H_6$), or any combination thereof. In one embodiment, the protective gas can comprise of at least one of nitrogen ($N_2$), ammonia ($NH_3$), and a noble gas. In one embodiment, the carbon source gas is acetylene, and the protective gas is argon. A height of the carbon nanotube array can range from about 200 micrometers to about 400 micrometers. In one embodiment, a height of the carbon nanotube array is about 200 micrometers.

The carbon nanotube array 10 formed on the substrate 20 is essentially free of impurities such as carbonaceous or residual catalyst particles, by controlling the growing condition thereof. The carbon nanotubes 30 in the carbon nanotube array 10 are closely packed together by van der Waals attractive force.

In the step of treating the carbon nanotube array to form a plurality of grooves, the carbon nanotube array 10 can be treated by laser or other methods, such as using certain tools to scratch the carbon nanotubes in the carbon nanotube array 10 to form the plurality of grooves. In one embodiment, the carbon nanotube array 10 is treated by laser.

Figure 4:
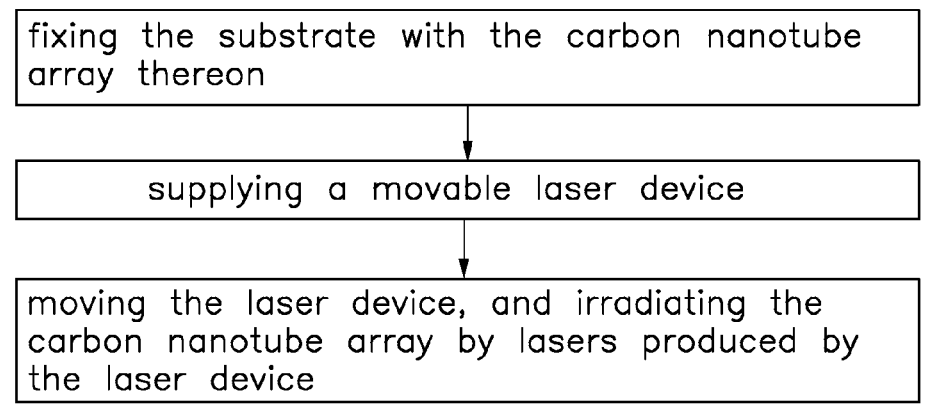
FIG. 4 is a chart of one embodiment of a method for treating a carbon nanotube array using a laser.

Referring to FIG. 4, the step of treating the carbon nanotube array to form a plurality of grooves can be executed by fixing the carbon nanotube array 10 and moving a laser device to irradiate the carbon nanotube array 10. The step of treating the carbon nanotube array to form a plurality of grooves can include:

fixing the substrate with the carbon nanotube array 10 thereon;

supplying a movable laser device;

moving the laser device, and irradiating the carbon nanotube array 10 by lasers produced by the laser device.

The laser device can include gas lasers, solid-state lasers, semiconductor lasers, dye lasers, or any other conventional laser. The laser device can include one or more lasers. In one embodiment, the laser device is a carbon dioxide laser device. The laser device can be moved along a predetermined way in any fashion, such as by an external force. In one embodiment, the laser device is controlled by a computer.

Figure 5:
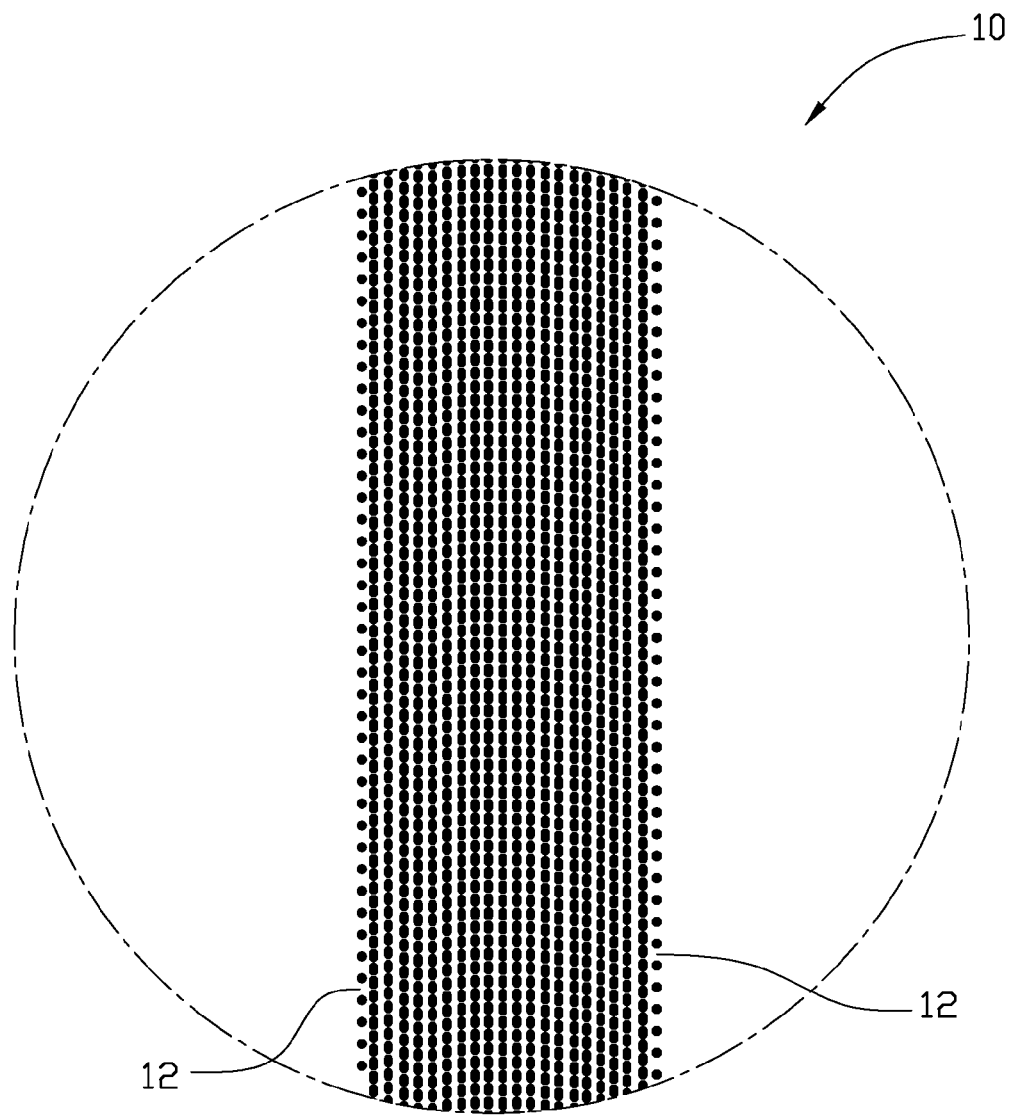
FIG. 5 is a schematic top plan view of one embodiment of a carbon nanotube array having grooves at opposite sides thereof.
Figure 6:
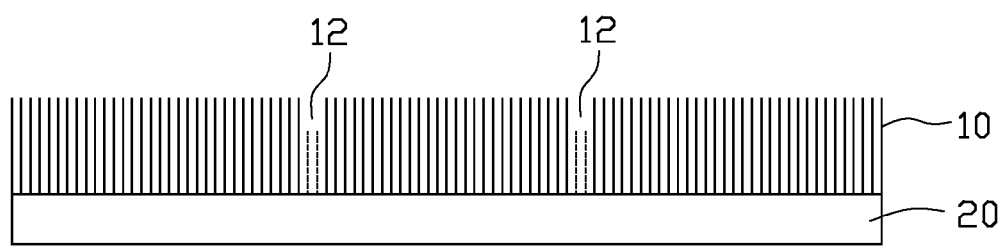
FIG. 6 is a front view of one embodiment of the carbon nanotube array having grooves at opposite sides thereof as shown in FIG. 5.

After irradiating the carbon nanotube array 10, the plurality of grooves can be formed. FIGS. 5-6 show two grooves 12. Since two adjacent grooves 12 are substantially parallel to each other, the carbon nanotube array between two adjacent grooves 12 has a uniform width (e.g., distance between two adjacent grooves). Thus, a width of the carbon nanotube array between two adjacent grooves 12 can be determined by the distance between two adjacent grooves 12. In one embodiment, the width of the carbon nanotube array between two adjacent grooves 12 is about 1 inch.

As the laser irradiates the carbon nanotube array 10, the laser is focused on the surface of carbon nanotube array 10 and forms a laser irradiating area, e.g., a circle area, on the carbon nanotube array 10, wherein a diameter of the laser irradiating area can range from about 1 micrometer to about 5 millimeters. As the laser moves, a strap-shaped laser irradiating pattern is formed. When the laser device includes one laser, the laser can irradiate the carbon nanotube array two or more times to form the plurality of grooves. If the laser device includes a plurality of lasers, the plurality of lasers can be arranged in a line, and a strap-shaped laser irradiating area can be formed without moving the laser device. In one embodiment, a length of the strap-shaped laser irradiating area is larger than or equal to the length of the formed grooves 12. The laser can be a red light laser having a wavelength of about 1054 nanometers, or a green light laser having a wavelength of about 527 nanometers. A moving speed of the laser can range from about 20 millimeters per second (mm/s) to about 150 mm/s. A power density of the laser can range from about $5 \times 10^7$ watts per square meters (w/m$^2$) to about $5 \times 10^9$ w/m$^2$. In one embodiment, the laser is a red light laser having a wavelength of about 1054 nanometers, a moving speed of the laser is about 100 mm/s, and a power density of the laser is about $1 \times 10^8$ w/m$^2$.

During the laser irradiating process, the carbon nanotubes absorb energy from laser irradiation and the temperature thereof is increased. Portions of the carbon nanotubes at the laser irradiating area are destroyed, thereby forming the grooves having a predetermined depth and width. The height of the carbon nanotubes in the grooves 12 decreases. If the height of the carbon nanotubes in the grooves is less than about 100 micrometers, the carbon nanotubes in the grooves 12 cannot be pulled out to form the carbon nanotube film. Thus, the acquired carbon nanotube film can have a uniform width.

However, to acquire a carbon nanotube film having a uniform width and having carbon nanotubes uniformly dispersed therein or having a same density, the height of the carbon nanotubes in the grooves 12 cannot be too low, because during the process of drawing the carbon nanotubes from the carbon nanotube array 10, the carbon nanotubes in the grooves 12 should maintain van der Waals attractive forces between the carbon nanotubes in the carbon nanotube array 10 adjacent thereto. As a result, the carbon nanotubes in the carbon nanotube array 10 which is not adjacent to the grooves 12 can be pulled at a same speed as the carbon nanotubes in the carbon nanotube array 10 which is adjacent to the grooves 12. If the height of the carbon nanotubes in the grooves 12 is too low, then there is no van der Waals attractive forces between the carbon nanotubes in the grooves 12 and the carbon nanotubes in the carbon nanotube array 10 which is adjacent to the corresponding grooves 12. The carbon nanotubes in the carbon nanotube array 10 which is adjacent to the grooves 12 can be consumed at a speed which is larger than that of the carbon nanotubes in the carbon nanotube array 10 which is not adjacent to the grooves 12, resulting in a curved boundary line of the carbon nanotube array 10 and the carbon nanotube film drawn therefrom. The acquired carbon nanotube film would then have a nonuniform density. Therefore, in one embodiment, the height of the carbon nanotubes in the grooves 12 can range from about 1 micrometer to about 100 micrometers. In another embodiment, the height of the carbon nanotubes in the grooves 12 can range from about 50 micrometers to about 100 micrometers. In yet another embodiment, the height of the carbon nanotubes in the grooves 12 is about 100 micrometers.

The width of the grooves 12 can be larger than the height of the carbon nanotubes in the carbon nanotube array 10 between two adjacent grooves. While drawing the carbon nanotubes to form a carbon nanotube film from the carbon nanotube array 10 between one pair of two adjacent grooves 12, if the width of the grooves 12 is too small, the carbon nanotubes in the carbon nanotube array 10 between another pair of two adjacent grooves 12 can be slanted or dumped across the groove 12 between these two portions of the carbon nanotube array 10, and participate in the process of forming the carbon nanotube film, thereby leading to an acquired carbon nanotube film having a nonuniform width. In one embodiment, the width of the grooves 12 is about 250 micrometers when the height of the carbon nanotube array 10 is about 200 micrometers.

It can be understood that alternatively, the step of treating the carbon nanotube array to form a plurality of grooves can be executed by fixing the laser device and moving the carbon nanotube array 10 for irradiating. The step of treating the carbon nanotube array to form a plurality of grooves can include supplying a fixed laser device and forming a fixed laser irradiating area, and moving the carbon nanotube array 10 at an even/uniform speed to pass through the fixed laser irradiating area.

In the step of selecting the plurality of carbon nanotubes from the carbon nanotube array between two adjacent grooves by using a tool, the plurality of carbon nanotubes can be selected at one end of the carbon nanotube array 10 between two adjacent grooves 12. A width of the selected carbon nanotubes can be about equal to the distance between two adjacent grooves 12. In one embodiment, if the carbon nanotube array 10 is grown on the round silicon wafer, the carbon nanotube array 10 is also round. After treatment by the laser, two ends of the carbon nanotube array 10 between two adjacent grooves 12 have an arc shape. The arc shape edges can define arc shape areas. The carbon nanotube array 10 between two adjacent grooves 12 can be divided into two arc shape areas and a rectangle shape area located therebetween. The selected carbon nanotubes can be located at the end of the arc shape edge adjacent to the rectangle shape area or at the beginning of the rectangle shape area, that is, the width of the selected carbon nanotubes is substantially equal to the distance between two adjacent grooves 12. The tool can be an adhesive tape, tweezers, or a clamp. In one embodiment, an adhesive tape is used to contact the carbon nanotubes of the carbon nanotube array 10 between two adjacent grooves 12. If the carbon nanotube array 10 is grown on a square substrate, and if the grooves 12 are substantially parallel to sides of the square substrate, the carbon nanotube array 10 between two adjacent grooves has a uniform width, and the carbon nanotubes can be directly selected from ends of the carbon nanotube array 10 between two adjacent grooves 12. A width of the selected carbon nanotubes would be substantially equal to a distance between the corresponding two adjacent grooves.

Figure 7:
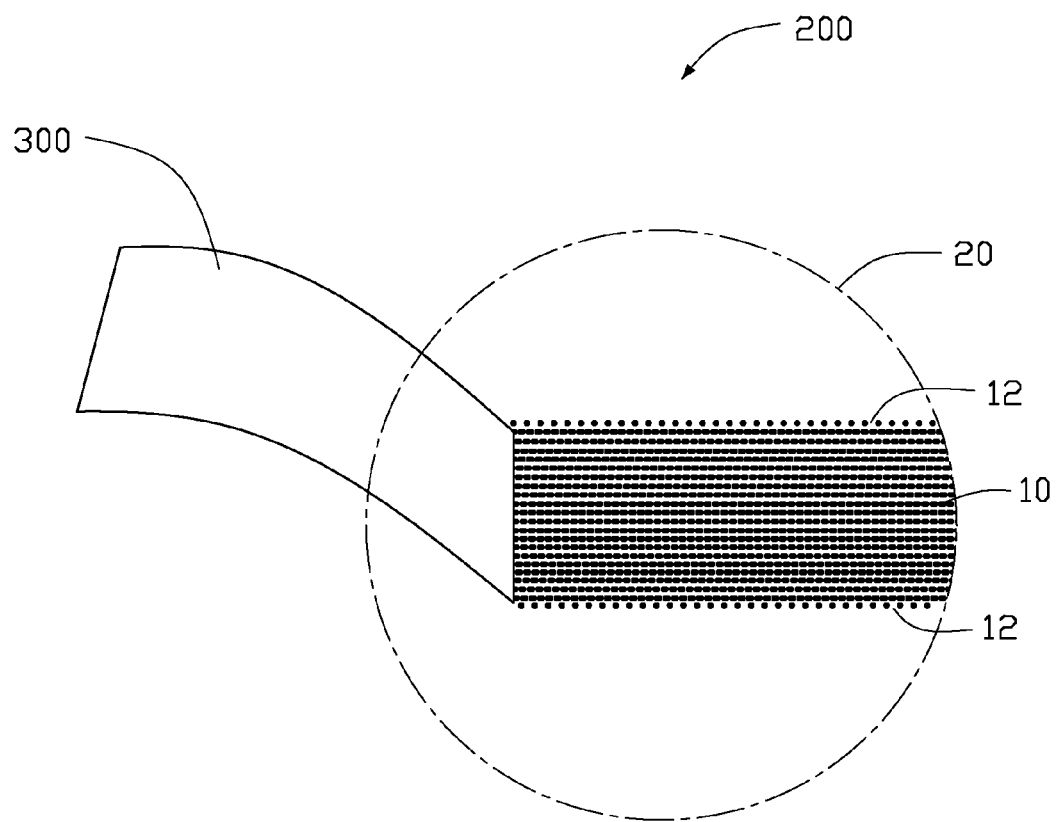
FIG. 7 is a schematic structural view of one embodiment of a carbon nanotube film.

In the step of pulling the selected carbon nanotubes along a direction substantially parallel to a length direction of the grooves by using the tool, the selected carbon nanotubes are pulled to form carbon nanotube segments that are joined end to end at a uniform speed to achieve a uniform carbon nanotube film (e.g., carbon nanotube film having a uniform density). Referring to FIG. 7, the carbon nanotube segments gradually disengage from the substrate 20 along a drawing direction of the carbon nanotubes. The carbon nanotube segments that are not totally disengaged from the substrate 20, a carbon nanotube precursor 200 is formed. The carbon nanotube precursor 200 includes the substrate 20, the carbon nanotube array 10 formed on the substrate 20 with a plurality of (e.g., two or more) grooves 12 substantially parallel and separated from each other, and at least one carbon nanotube film 300. The height of the carbon nanotubes in the grooves 12 is less than or equal to 100 micrometers. The carbon nanotube film 300 is connected to the carbon nanotubes between two corresponding adjacent grooves 12, and has a uniform width. If the height of the carbon nanotubes in the grooves 12 is greater than about 1 micrometer and less than about 100 micrometers, the carbon nanotube film 300 has a substantially uniform width and includes a plurality of carbon nanotubes substantially uniformly dispersed therein (e.g., the carbon nanotube film 300 has a substantially uniform density). In one embodiment, the change in density across the carbon nanotube film 300 is within 10 percent. The carbon nanotube film 300 also can have substantially the same density of the carbon nanotubes along the width of the carbon nanotube film 300. In one embodiment, the change in density across the width is within 10 percent. In another embodiment, the change in density across the width is within 5 percent. The carbon nanotube film 300 is connected to the carbon nanotube array 10 between two adjacent grooves 12 along the lengthwise direction of the carbon nanotube film 300 or the carbon nanotube array 10, thereby the carbon nanotube film 300 can have a uniform width. The carbon nanotube film 300 includes a plurality of carbon nanotubes arranged approximately along a same direction or arranged along a preferred orientation. The carbon nanotubes in the carbon nanotube film 300 are joined end to end by van der Waals attractive force therebetween. The carbon nanotubes in the carbon nanotube film 300 are substantially parallel to the drawing direction of the carbon nanotubes (e.g., Lengthwise directions of the plurality of carbon nanotubes are substantially parallel to the drawing direction of the carbon nanotube film).

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube film, the method comprising:
   providing a carbon nanotube array, comprising a plurality of carbon nanotubes, on a substrate, wherein the plurality of carbon nanotubes have approximately the same height, and the height of the plurality of carbon nanotubes range from about 200 micrometers to about 400 micrometers;
   treating portions of the plurality of carbon nanotubes to form a plurality of separated grooves substantially parallel to each other, the plurality of treated carbon nanotubes have approximately the same height, and the height of the plurality of treated carbon nanotubes is reduced to less than 100 micrometers;
   selecting a plurality of untreated carbon nanotubes between adjacent two of the plurality of grooves by using a tool; wherein a width of the selected plurality of untreated carbon nanotubes is equal to a distance between two adjacent grooves;

pulling the selected plurality of untreated carbon nanotubes along a direction substantially parallel to lengthwise directions of the adjacent two of the plurality of grooves by using the tool, the plurality of untreated carbon nanotubes being joined end to end as the plurality of untreated carbon nanotubes are drawn out along a direction from the carbon nanotube array to form one or more carbon nanotube films.

2. The method of claim 1, wherein the step of treating the portion of the plurality of carbon nanotubes is executed by:

fixing the substrate with the carbon nanotube array thereon;

supplying a movable laser device; and moving the laser device, and irradiating the portion of the plurality of carbon nanotubes by one or more lasers produced by the laser device.

3. The method of claim 2, wherein the one or more lasers are red light lasers having a wavelength of about 1054 nanometers, or green light lasers having a wavelength of about 527 nanometers.

4. The method of claim 2, wherein a power density of the one or more lasers is in a range from about $5 \times 10^7$ watts per square meters to about $5 \times 10^9$ watts per square meters and a moving speed of the one or more lasers is in a range from about 20 millimeters per second to about 150 millimeters per second.

5. The method of claim 1, wherein the step of treating the portion of the plurality of carbon nanotubes is executed by:

supplying a fixed laser device and forming a fixed laser irradiating area by one or more lasers produced by the fixed laser device; and moving the carbon nanotube array at a substantially constant speed to pass through the fixed laser irradiating area.

6. The method of claim 5, wherein the one or more lasers are red light lasers having a wavelength of about 1054 nanometers, or green light lasers having a wavelength of about 527 nanometers.

7. The method of claim 5, wherein a power density of the one or more lasers is in a range from about $5 \times 10^7$ watts per square meters to about $5 \times 10^9$ watts per square meters and a moving speed of the one or more lasers is in a range from about 20 millimeters per second to about 150 millimeters per second.

8. The method of claim 1, wherein the height of the treated carbon nanotubes is greater than about 1 micrometer.

9. The method of claim 1, wherein the plurality of untreated carbon nanotubes is selected by contacting the untreated carbon nanotubes between two adjacent grooves by an adhesive tape.

10. A method for making a carbon nanotube film, the method comprising:

providing a carbon nanotube array comprising a plurality of carbon nanotubes on a substrate, wherein the plurality of carbon nanotubes have approximately the same height, and the height of the plurality of carbon nanotubes range from about 200 micrometers to about 400 micrometers;

irradiating a laser on portions of the plurality of carbon nanotubes to form a plurality of separated grooves substantially parallel to each other, wherein the plurality of irradiated carbon nanotubes have approximately the same height, and the height of the plurality of irradiated carbon nanotubes is reduced to less than 100 micrometers by the laser;

selecting a plurality of un-irradiated carbon nanotubes between adjacent two of the plurality of grooves by using a tool; wherein a width of the selected plurality of un-irradiated carbon nanotubes is equal to a distance between two adjacent grooves;

pulling the selected plurality of un-irradiated carbon nanotubes along a direction substantially parallel to lengthwise directions of the adjacent two of the plurality of grooves by using the tool to form one or more carbon nanotube films, wherein the carbon nanotube film comprises a plurality of carbon nanotubes arranged approximately along a first direction, the plurality of carbon nanotubes is joined end to end by van der Waals attractive force therebetween, and the carbon nanotube film has a uniform width equal to the distance between two adjacent grooves.

11. The method of claim 10, wherein the laser is red light laser having a wavelength of about 1054 nanometers, or green light laser having a wavelength of about 527 nanometers.

12. The method of claim 10, wherein a diameter of a laser irradiating area ranges from about 1 micrometer to about 5 millimeters.

13. The method of claim 10, wherein the height of the plurality of irradiated carbon nanotubes range from about 50 micrometers to about 100 micrometers.

14. The carbon nanotube film of claim 10, wherein and a change in density of the carbon nanotube film across the width is within 10 percent.

15. The carbon nanotube film of claim 14, wherein the change in density of the carbon nanotube film across the width is within 5 percent.

* * * * *